United States Patent Office 3,462,707
Patented Aug. 19, 1969

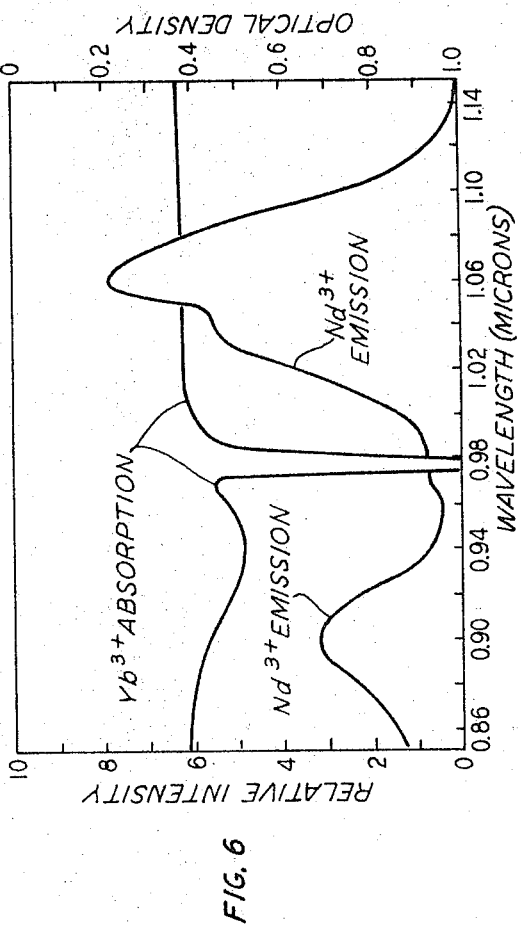
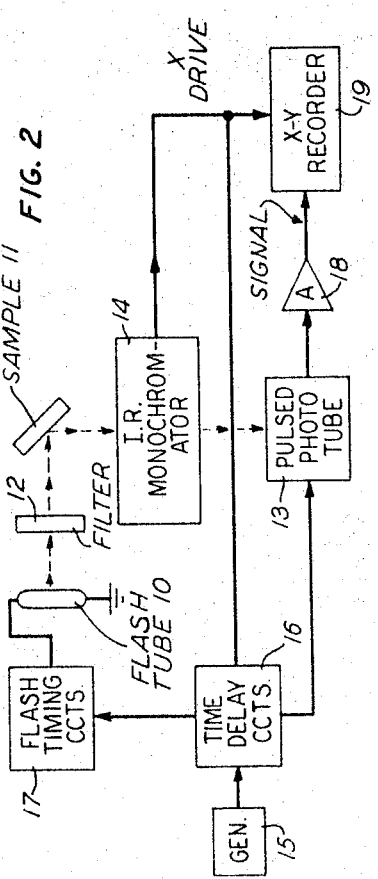
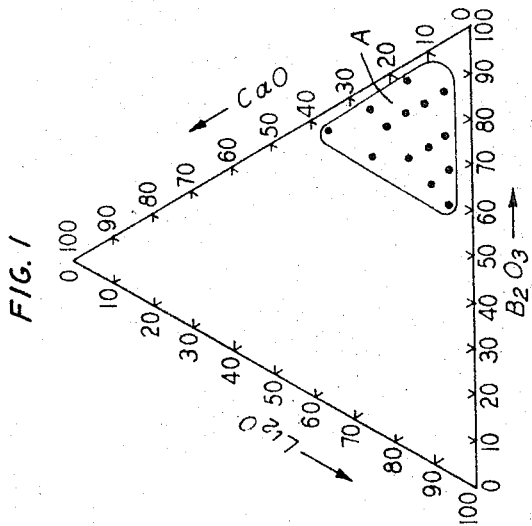

3,462,707
Nd AND Yb DOPED BORATE LASER GLASS
Arthur D. Pearson, Bernardsville, George E. Peterson, Plainfield, and Sergio P. S. Porto, North Plainfield, N.J., assignors to Bell Telephone Laboratories, Incorporated, New York, N.Y., a corporation of New York
Filed May 25, 1965, Ser. No. 458,624
Int. Cl. H01s 3/09, 3/16, 3/08
U.S. Cl. 331—94.5   3 Claims

ABSTRACT OF THE DISCLOSURE

An active glass laser material composed of a lithium-calcium borate glass host containing from 0.1 percent to 10 percent each of neodymium and ytterbium is described. Features of the inventive material include: pumping of ytterbium by neodymium, by way of a nonradiative resonant energy transfer, thus permitting lasing of ytterbium at a threshold of about 100 joules, almost three times smaller than the threshold for lasing of ytterbium in the absence of neodymium; an increase in the total number of absorption bands as compared to a material containing either neodymium or ytterbium separately, and the apparent elimination of concentration quenching of neodymium, thus permitting a more highly absorbing material and consequent laser emissions at greater power levels.

---

This invention relates to glass lasers and more specfically to a glass laser in which the host material is a particular borate glass and the active constituent is a combination of ytterbium and neodymium.

In crystalline and glass lasers, excitation of the fluorescent ions is usually accomplished by means of an external light source. Generally the energy is absorbed directly into the high lying absorption bands of the fluorescent ion and is then re-emitted as fluorescence from the same ion. An examination of the absorption spectra of the trivalent rare earth elements shows that even in the case of rare earths in glass hosts the absorption lines are relatively sharp. Since only light corresponding in wavelength to the wavelengths of the absorption bands can be absorbed by the fluorescent ion, this means that a large, and in most cases probably a major part of the light from the flashlamp is wasted. In order to have more efficient usage of the output of the flashlamp, it would therefore, be useful if light from the unused spectral portion of the lamp output could be absorbed by another constituent of the laser rod and the energy then be transferred to the active laser ions. This invention is based on this concept wherein some of the energy is absorbed from the flashlamp by an ion species other than the laser ion, dissolved in the laser material, followed by transfer of this energy to the active laser ion.

Two types of energy exchange can take place between two such ions. The first is a relatively trivial process known as photon capture or emission and reabsorption. In this sort of process light from the flashlamp is absorbed by ion A which then proceeds to emit this energy as its own characteristic fluorescence. If the wavelength of one of ion A's strong emission lines coincides with the wavelength of an absorption line of ion B, then ion B can absorb ion A's fluorescence and then re-emit it as its own characteristic fluorescent radiation. However, only energy emitted by ion A at the wavelength corresponding to ion B's absorption band is captured by ion B. Any energy which ion A emits at other wavelengths will not be reabsorbed. In the second type, which is known as resonance transfer, energy is transferred from ion A to ion B without the need for the emission of a photon from ion A. For this reason this sort of process is referred to as radiationless or nonradiative transfer. This invention is concerned with this nonradiative transfer process. In order for this type of energy exchange to take place, an energy gap downwards in ion A must approximately match an energy gap upwards in ion B. The initial state of the downward transition in ion A is populated by excitation from a flashlamp. The lower state of the gap in ion B must also be populated; it may for instance be the ground state or else a state lying close to the ground state, which is thermally populated under the conditions of operation. In the resonance mechanism the transition of an electron from the upper to the lower state of the transition in ion A is matched by the promotion of an electron from the lower to the upper state in ion B. All of the absorption bands lying above the upper state of the transition in ion A which feed the upper state in ion A can therefore contribute energy to such a process. The efficiency with which the energy is transferred from A to B will depend of course on the relative rate at which the energy is tranferred compared to the rate at which ion A can dissipate the energy by other processes such as fluorescence and internal conversion. For good efficiency the rate of transfer should be comparable to or preferably faster than the rate at which ion A would otherwise dissipate its energy.

It has been found that a particularly effective ion combination, from the standpoint of these and other considerations, are the rare earth ions ytterbium and neodymium in a borate glass host.

In considering the more specific aspects of the invention it is helpful to refer to the drawing. In the drawing:

FIG. 1 is a ternary phase diagram showing the glass compositions useful as host lattice materials within the scope of this invention;

FIG. 2 is a block diagram showing an apparatus used for obtaining the results shown by FIGS. 3 through 5;

FIG. 6 is the absorption spectrum of ytterbium compared with the emission spectrum of neodymium in a borate glass.

Figure 3:
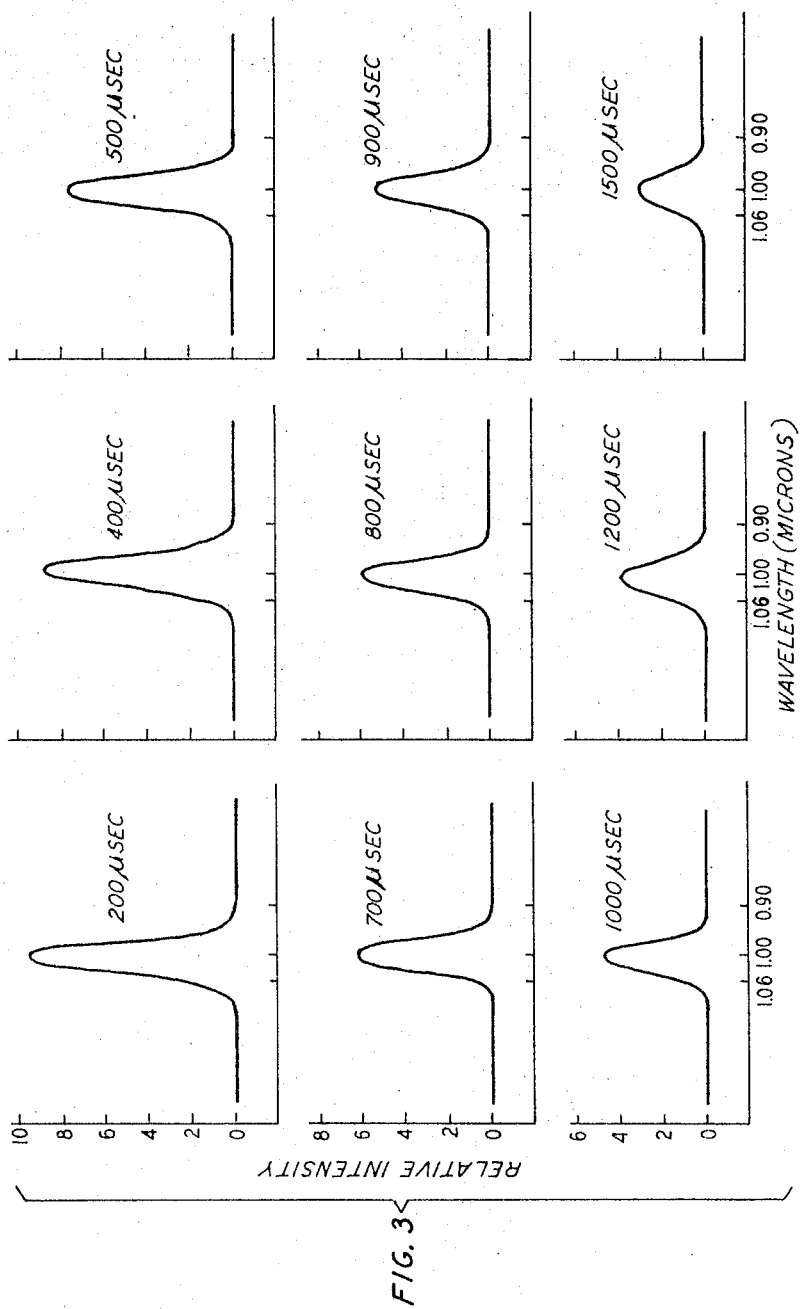
FIG. 3 is a series of time resolved spectra showing the emission behavior of $Yb^{+3}$ in a borate glass of the system shown in FIG. 1.

The host glass materials upon which part of the invention relies are borate glasses containing lithium oxide, calcium oxide and boron oxide. The glass-forming compositions in this ternary system are indicated by the area A of the phase diagram of FIG. 1. The proportions are given in mol percent. In this particular host glass system the energy levels of the neodymium and ytterbium are favorable for obtaining resonance and thereby an effective energy transfer from the principle absorbing ion, neodymium to be the fluorescing ion, ytterbium. In particular, the relative lifetimes of the radiative transitions of these ions in this glass system is such that the fluorescent lifetime of the neodymium ion is long enough to permit a nonradiative transition to the ytterbium ion. These transition times vary significantly according to the host material so that in certain hosts both of the ions of this particular ion pair fluoresce thus preventing a significant transfer of energy from the broad band absorbing ion ($Nd^{+3}$) into radiative transitions from the ytterbium ion.

Borate glasses within the compositional ranges indicated in FIG. 1 can be prepared in the following manner.

The glasses are prepared from reagent grade boric acid, calcium carbonate and lithium carbonate. The rare earth dopants are added as oxides when the original dry powders are mixed. Glasses are prepared by fusing together the mixed, dry starting materials, in stoichiometric proportions, in a platinum crucible with R.F. heating, the crucible acting as susceptor. Large bubbles can be removed from the melt by a heat treatment at 1300° C., while microscopic bubbles are removed by a soaking at 1100° C. Optical homogeneity is attained by stirring the molten glass with a platinum stirrer at 1000° C. for one hour then gradually decreasing the temperature over a period of 1.5 hours to 850° C. At this temperature the stirrer is removed and the glass is allowed cool to about 700° C. in room air. The crucible and its contents are then placed in a preheated oven at 550° C. and the oven temperature is gradually reduced to room temperature at a rate of about 0.5° C. per minute. When cold, the platinum crucible can be cut away from the block of glass by means of a carborundum wheel and the block of glass is annealed. Samples are cut from the blocks by means of a diamond wheel.

Since the absorption and emission lines of yetterbium and neodymium are much broader in a glass host than in a crystalline host, a more favorable overlap of the energy gaps of the neodymium and yetterbium is obtained by employing the glass host. This produces better resonance between the two ions than would be the case in a crystalline system. A series of time resolved emission spectra were obtained from a sample of glass containing 0.5 mol percent $Yb_2O_3$, 0.5 mol percent $Nd_2O_3$ and 0.5 mol percent of both of these constituents. The spectra can then be compared to demonstrate certain features of the invention. In each case the borate glass composition was 10 mol percent $Li_2O$, 20 mol percent CaO and 70 mol percent $B_2O_3$.

The time resolved spectra were obtained using the equipment shown in the diagram of FIG. 2. An FX-3 flashlamp 10 excites the sample 11 40 times per second. This lamp has a full half width of 2 microseconds. Colored glass filters indicated at 12 are used to select the band of radiation applied to the sample. A 7102 photomultiplier tube 13 detects the fluorescence through a Perkin-Elmer Type 98 I.R. monochromator 14. The photo tube is gated with 1.5 k.v. pulses from pulse generator 15 timed at varying times after the flash with timing circuits 16 and 17. The current pulses from the anode of the photomultiplier are fed to an operational amplifier 18 having an integration time about 5 seconds. The resulting D.C. is displayed on an $xy$ recorder 19 whose $x$ axis is coupled to the wavelength drive of the monochromator 14. By suitably rearranging the equipment and coupling the time delay generator to the $x$ axis of the recorder, fluorescence decay curves can be obtained directly.

Figure 4:
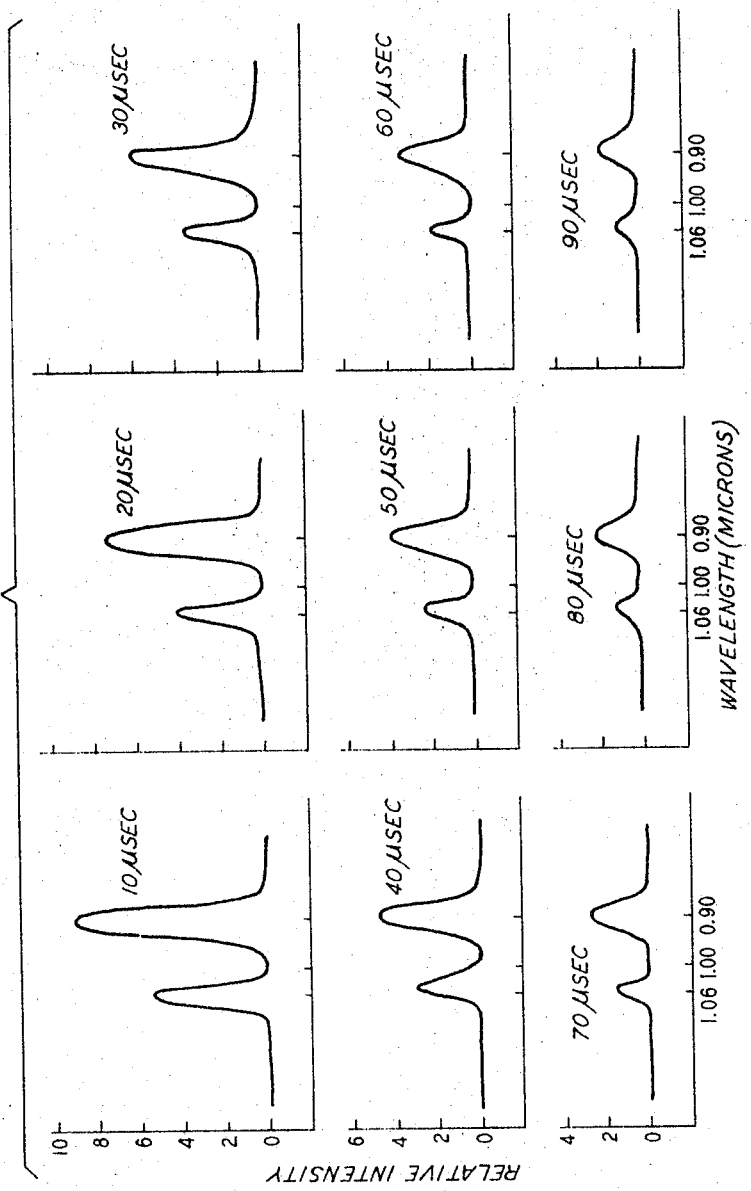
FIG. 4 is a series of time resolved spectra similar to those of FIG. 3 obtained with $Nd^{+3}$.

Detailed study with the 0.5 mol percent $Yb_2O_3$ sample showed there were no rises in fluorescence intensity immediately following the flash. This indicates that non-radiative relaxations among the crystal field components of the $^2F_{5/2}$ state of the ytterbium are fast. The spectra are shown in FIG. 3 with intensity plotted as ordinate vs. wavelength. As can be seen there are no changes in the shape of the emission line as the fluorescence decays. Determination of the fluorescence intensity as a function of time showed that the decay was an exponential with a time constant of 1 millisecond. FIG. 4 shows a similar series of time resolved emission spectra obtained with a sample of the same base glass composition containing 0.5 mol percent $Nd_2O_3$. Only, the $^4F_{3/2} \rightarrow {}^4I_{11/2}$ and the $^4F_{3/2} \rightarrow {}^4I_{9/2}$ transitions are shown. Again no rises in fluorescence were observed indicating that the internal conversions to the $^4F_{3/2}$ state were fast. As can be seen no changes in line shape within the spectral resolution of the equipment were found as a function of time. The fluorescence decay was found to be an exponential function with a time constant of 50 microseconds, both transitions giving identical lifetimes.

These data establish that both the ytterbium and neodymium ions when dissolved separately in this glass host decay in a "normal" fashion.

Figure 5:
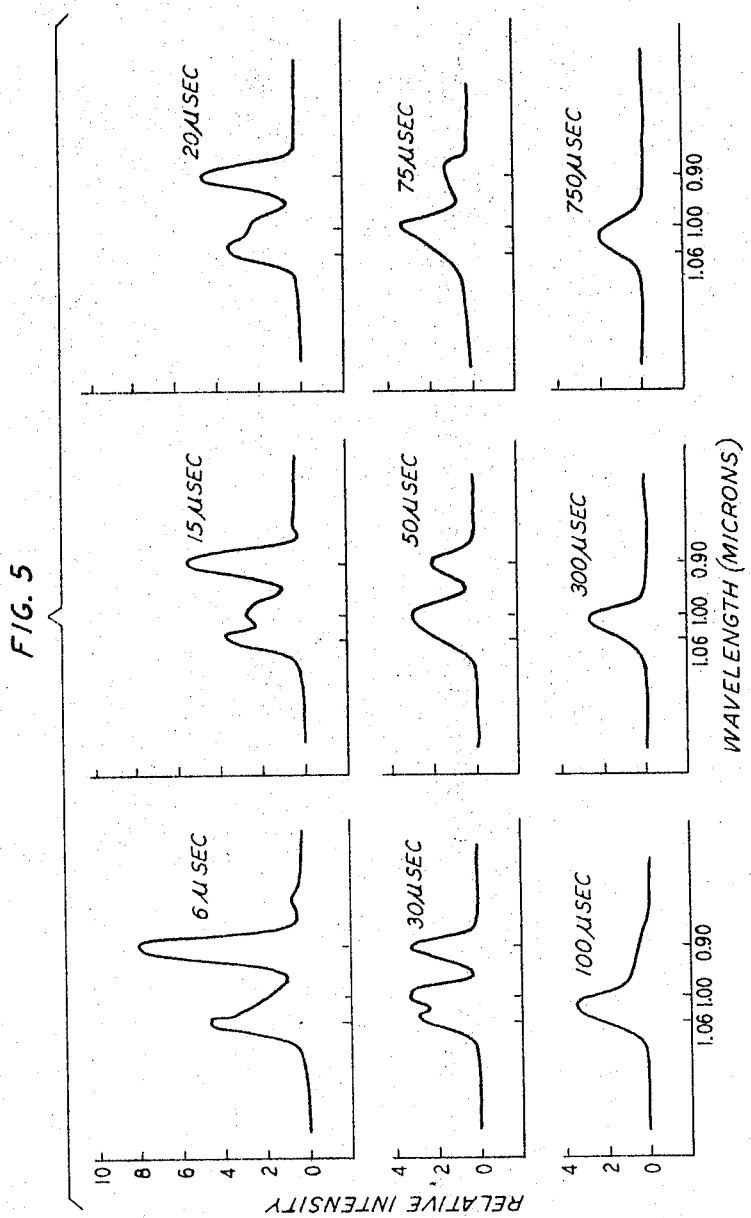
FIG. 5 is a similar series of time resolved spectra for the combined ions $Yb^{+3}$ and $Nd^{+3}$.

FIG. 5 shows a series of time resolved emission spectra obtained on a glass sample of the same base composition this time doped with 0.5 mol percent $Yb_2O_3$ and 0.25 mol percent $Nd_2O_3$. Excitation was applied to the sample through a Corning #4–96 filter, which only permits the neodymium to be pumped. From FIG. 5 it can be seen that a short time after the initiation of the flash (6 microseconds), the intensity of neodymium fluorescence is strong while the emission from the ytterbium is quite weak. The neodymium fluorescence decays rapidly with time while at the same time the ytterbium fluorescence intensity increases and reaches a peak at about 100 microseconds. This is in distinct contrast to the behavior of ytterbium when dissolved alone in this glass where no rises in fluorescence were observable.

Determination of the fluorescence decay times of the two ions shows that the ytterbium decay is exponential with a lifetime of one millisecond, the same value as is obtained when the ion was present alone in this host. This indicates that there is little or no energy transfer from the ytterbium back to the neodymium. The neodymium decay, however, is shortened by at least 50 percent when the ion is present together with ytterbium. It is no longer a single exponential but appears to contain a number of components. A representative figure for the fluorescence lifetime of the neodymium in the presence of ytterbium is about 20 microseconds. This decrease in the lifetime of the neodymium in the presence of ytterbium shows that the neodymium is now losing energy by a new process other than its own fluorescence, i.e., nonradiative transfer of energy from the neodymium ion to the ytterbium ion.

In FIG. 6 the absorption spectrum of ytterbium is compared with the emission spectrum of neodymium dissolved in this glass matrix. An overlap exists between the ytterbium $^2F_{5/2} - {}^2F_{7/2}$ and the neodymium $^4F_{3/2} - {}^4I_{9/2}$ energy gaps so that a resonance condition can exist. However, since the overlap is fairly weak the probability of significant photon capture is small. In addition the overlap which does exist between the ytterbium absorption and the neodymium emission is with the $^4F_{3/2} \rightarrow {}^4I_{9/2}$ neodymium emission. However, reference to FIG. 5 shows that both the neodymium emissions are quenched out at the same rate in the presence of ytterbium thus further establishing the radiationless resonance transfer mechanism.

When 0.5 mol percent $Yb_2O_3$ and 0.5 mol percent $Nd_2O_3$ were incorporated together into a borate glass (10 mol percent $Li_2O$, 20 mol percent CaO, 70 mol percent $B_2O_3$), laser action was observed at 1.018 microns with a threshold of 100 joules. This emission is characteristic of the ytterbium ion. Even when the input energies to the flashlamp were raised 300 percent above the threshold value no laser action or even fluorescence was observed at the neodymium wavelengths. As compared with the threshold for ytterbium oscillation when alone, which is of the order of 260 joules, the ytterbium threshold when in the presence of neodymium, 100 joules, is notable.

In order to determine the pumping wavelength for each of the three differently doped rods the experimental laser equipment was changed so that the sample could be placed outside of the helical flash tube and sharp cutoff Corning filters interposed between the flashlamp and the laser rod. The results show that the neodymium dissolved alone in the glass is pumped primarily in the region from 7200 to 8900 Angstroms with a small contribution from other visible bands. The ytterbium ion alone in the glass is pumped in the one micron region. In the case of the doubly doped glass, laser action was obtained at a threshold of 2600 joules using a Corning 2–58 filter which transmits 85 percent of all wavelengths between 0.6 and 2.5 microns.

When a Corning 7–57 filter was substituted, no laser action could be observed up to 4500 joules. This second filter cuts out practically all radiation corresponding to the $^4I_{9/2} \to {}^4S$ neodymium obsorption and about half that corresponding to the $^4I_{9/2} \to {}^2H$ absorption, while still transmitting 80 percent of radiation in the one micron region. Thus the blocking of half the neodymium absorption bands while only blocking about 5 percent of the ytterbium absorption band increased the threshold so that it became out of range of the equipment. This indicates that a major part of the excitation of the ytterbium ions is accomplished via the neodymium absorption bands.

Figure 7:
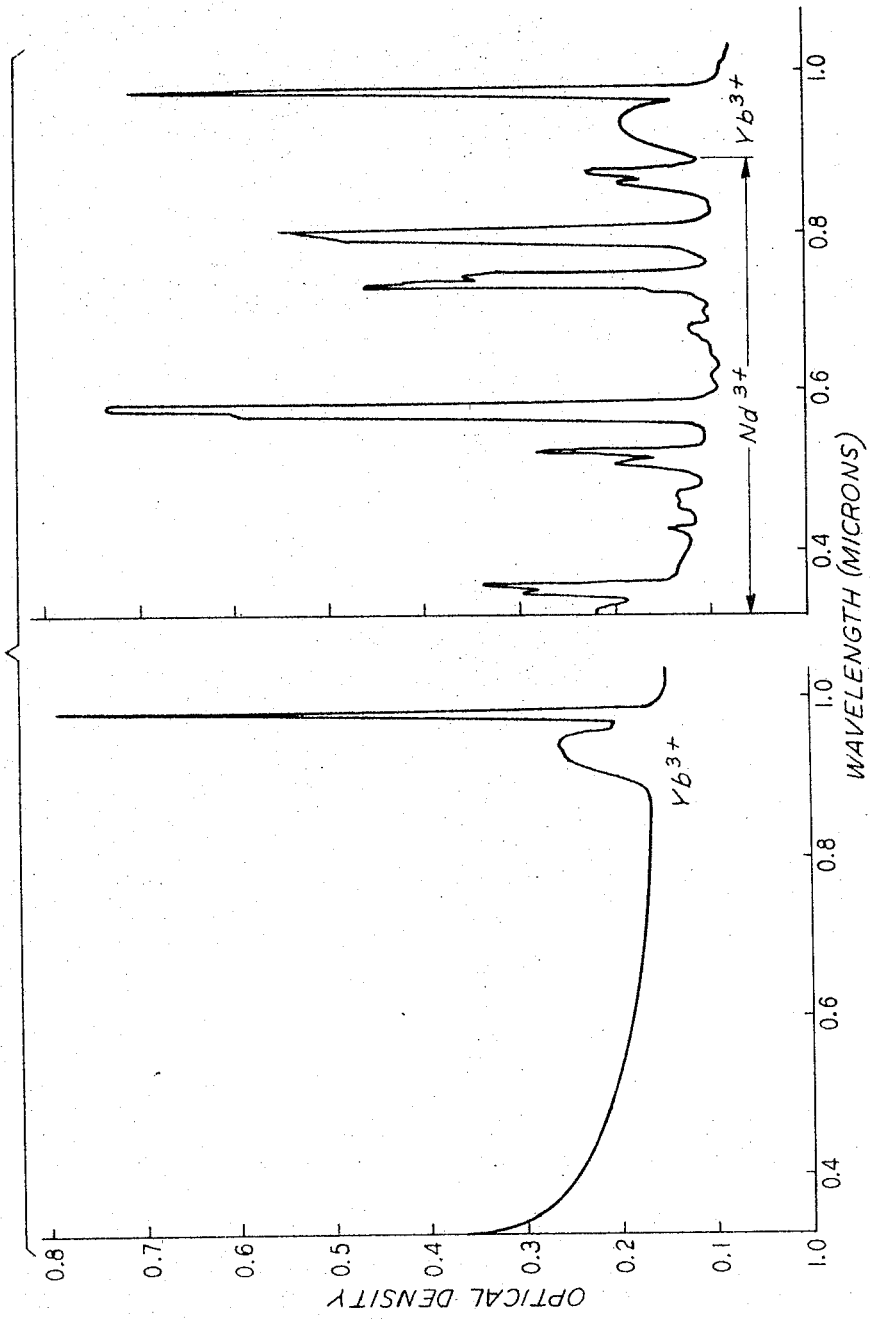
FIG. 7 is a comparison between the absorption spectrum of ytterbium and the combined absorption spectrum of ytterbium and neodymium in a borate glass of the invention.

In FIG. 7 the absorption spectrum of the doubly doped glass is compared with the spectrum when ytterbium is incorporated alone. The increase in the number of pumping bands is striking.

Another interesting and significant feature of the present invention is the apparent elimination of concentration quenching of the neodymium ion permitting a more highly absorbing laser material. The phenomenon of concentration quenching is not fully understood but it is generally known that as the concentration of neodymium in the host material is increased above 1 percent the threshold begins to increase sharply. Consequently, it is well established that when using $Nd^{+3}$ alone the $Nd^{+3}$ concentration should be maintained below 1 percent. For unexpected reasons the neodymium concentration in the laser material of this invention can be extended beyond 1 percent with no apparent increase in threshold. This permits the glass materials to absorb more energy from the pump source and to emit at greater power levels. Borate glasses with as much as 2 percent $Nd^{+3}$ when combined with $Yb^{+3}$ have lased successfully. Although it is not essential, the ytterbium concentration is adjusted to approximately match the neodymium concentration since it is predictable that at a large ratio of $Nd^{+3}/Yb^{+3}$ the neodymium will begin to fluoresce. It is considered desirable that the concentration of the two ions not differ more than 100:1. The minimum useful concentration of the ions is 0.1 percent of each ion. The maximum is imposed by the tendency of the glass to crystallize if the impurity loading becomes too high. Using proper precautions doping levels as high as 10 percent combined total of both ions are obtainable.

What is claimed is:

1. A laser comprising an active laser material consisting essentially of a borate glass host having a composition falling within the area A of the ternary diagram of FIG. 1, said glass host including both neodymium ions and ytterbium ions with a concentration of from 0.1 percent to 10 percent of each ion, and means for pumping said active material.

2. An active material for a laser consisting essentially of a borate glass host having a composition falling within the area A of the ternary diagram of FIG. 1, said glass host including both neodymium ions and ytteribum ions with a concentration of from 0.1 percent to 10 percent of each ion.

3. The composition of claim 2 wherein the neodymium ion concentration exceeds 1 percent.

References Cited

UNITED STATES PATENTS

| | | | |
|---|---|---|---|
| 3,208,009 | 9/1965 | Etzel et al. | 252—301.4 |
| 3,254,031 | 5/1966 | De Paolis et al. | 252—301.4 |

OTHER REFERENCES

Johnson et al.—Physical Review—vol. 133, No. 2A, Jan. 20, 1964, pages A494–A498. Copy in Scientific Library and 331—94.5.

Pearson et al.—Applied Physics Letters, vol. 4, No. 12, June 15, 1964, pages 202–204. Copy in 331—94.5 and Scientific Library.

TOBIAS E. LEVOW, Primary Examiner

ROBERT D. EDMONDS, Assistant Examiner

U.S. Cl. X.R.

252—301.4; 330—4.3